United States Patent
Pain et al.

(10) Patent No.: US 10,583,708 B2
(45) Date of Patent: Mar. 10, 2020

(54) CONNECTING PIPE LINKING A THERMAL DEVICE OF A MOTOR VEHICLE TO A FIREWALL OF THE VEHICLE

(71) Applicant: RENAULT s.a.s., Boulogne Billancourt (FR)

(72) Inventors: Olivier Pain, Poissy (FR); Herve Bousquet, Chatillon (FR); Emmanuel Botte, Rioux (FR)

(73) Assignee: RENAULT s.a.s., Boulogne Billancourt (FR)

(*) Notice: Subject to any disclaimer, the term of this patent is extended or adjusted under 35 U.S.C. 154(b) by 709 days.

(21) Appl. No.: 15/101,612

(22) PCT Filed: Dec. 1, 2014

(86) PCT No.: PCT/EP2014/076110
§ 371 (c)(1),
(2) Date: Sep. 7, 2016

(87) PCT Pub. No.: WO2015/082401
PCT Pub. Date: Jun. 11, 2015

(65) Prior Publication Data
US 2016/0368344 A1 Dec. 22, 2016

(30) Foreign Application Priority Data

Dec. 3, 2013 (FR) ..................................... 13 62026

(51) Int. Cl.
*B60H 1/00* (2006.01)
*B60H 1/28* (2006.01)
*B60H 1/24* (2006.01)

(52) U.S. Cl.
CPC ..... *B60H 1/00564* (2013.01); *B60H 1/00021* (2013.01); *B60H 1/242* (2013.01);
(Continued)

(58) Field of Classification Search
CPC .................................................. B60H 1/00528
(Continued)

(56) References Cited

U.S. PATENT DOCUMENTS 2,780,077 A * 2/1957 Jacobs ............... B60H 1/00007
165/43
3,306,177 A * 2/1967 Lewis ................ B60H 1/00028
454/161
(Continued)

FOREIGN PATENT DOCUMENTS

DE  10 2006 060 551 A1  6/2008
DE  10 2008 018 295 B4  10/2009
(Continued)

OTHER PUBLICATIONS

International Search Report dated Feb. 18, 2015 in PCT/EP2014/076110 filed Dec. 1, 2014.
(Continued)

*Primary Examiner* — Edelmira Bosques
*Assistant Examiner* — Frances F. Hamilton
(74) *Attorney, Agent, or Firm* — Oblon, McClelland, Maier & Neustadt, L.L.P.

(57) ABSTRACT

A connecting pipe is made from polymer material and is shaped to link an opening of an air inlet pipe of a thermal device of a motor vehicle and an opening of a firewall of the vehicle. The connecting pipe has a cross section equal to or greater than a cross section of the air inlet pipe. The connecting pipe has two open ends. The two open ends include a first open end having a first interface which is shaped to be assembled and fixed to the air inlet pipe, and a second open end having a second interface which includes a bearing surface which is shaped to be applied against the firewall on the periphery of the firewall opening.

12 Claims, 2 Drawing Sheets

(52) U.S. Cl.
CPC .............. *B60H 2001/00085* (2013.01); *B60H 2001/00214* (2013.01); *B60H 2001/00635* (2013.01)

(58) Field of Classification Search
USPC .................................................. 454/146, 158
See application file for complete search history.

(56) References Cited

U.S. PATENT DOCUMENTS

| | | | | |
|---|---|---|---|---|
| 3,747,500 | A * | 7/1973 | Redd ..................... | B60H 1/28 454/123 |
| 4,664,551 | A * | 5/1987 | Poitier ............... | B60H 1/00528 403/335 |
| 4,726,823 | A * | 2/1988 | Brice ..................... | B01D 46/10 116/268 |
| 4,819,550 | A * | 4/1989 | Ioka ........................ | B60H 1/28 454/147 |
| 5,254,033 | A * | 10/1993 | Brauen ................ | B60H 3/0641 454/146 |
| 5,275,017 | A | 1/1994 | Thomas | |
| 6,203,420 | B1 * | 3/2001 | Loup .................. | B60H 1/00471 454/139 |
| 6,745,586 | B1 * | 6/2004 | Reimann ............ | B60H 1/00371 454/903 |
| 6,866,576 | B2 * | 3/2005 | Quinn .................. | B60H 1/248 454/162 |
| 7,275,985 | B2 * | 10/2007 | Lewis .................... | B60H 1/28 454/147 |
| 7,484,379 | B2 * | 2/2009 | Shibata et al. .......... | B60H 1/32 62/222 |
| 7,517,280 | B2 * | 4/2009 | McConnell ............ | B60H 1/249 137/512.1 |
| 8,430,365 | B2 * | 4/2013 | Benoit ....................... | F16L 5/14 248/49 |
| 9,849,750 | B2 * | 12/2017 | Sukuki ............... | B60H 1/00535 |
| 2004/0026585 | A1 * | 2/2004 | Hutt .................... | B60R 11/0223 248/309.1 |
| 2004/0185767 | A1 * | 9/2004 | Schneider ............ | B60H 3/0641 454/158 |
| 2008/0233855 | A1 * | 9/2008 | Baudouin ............ | B60H 1/0055 454/143 |
| 2013/0153316 | A1 * | 6/2013 | Stuckey ............ | B60H 1/00278 180/68.5 |
| 2014/0160683 | A1 * | 6/2014 | Snider ................... | H04B 1/082 361/709 |

FOREIGN PATENT DOCUMENTS

| | | |
|---|---|---|
| DE | 10 2011 011 253 A1 | 8/2012 |
| EP | 0 594 510 A1 | 4/1994 |
| FR | 2 786 437 A1 | 6/2000 |

OTHER PUBLICATIONS

French Search Report dated Aug. 19, 2014 in FR 1362026 filed Dec. 3, 2013.

* cited by examiner

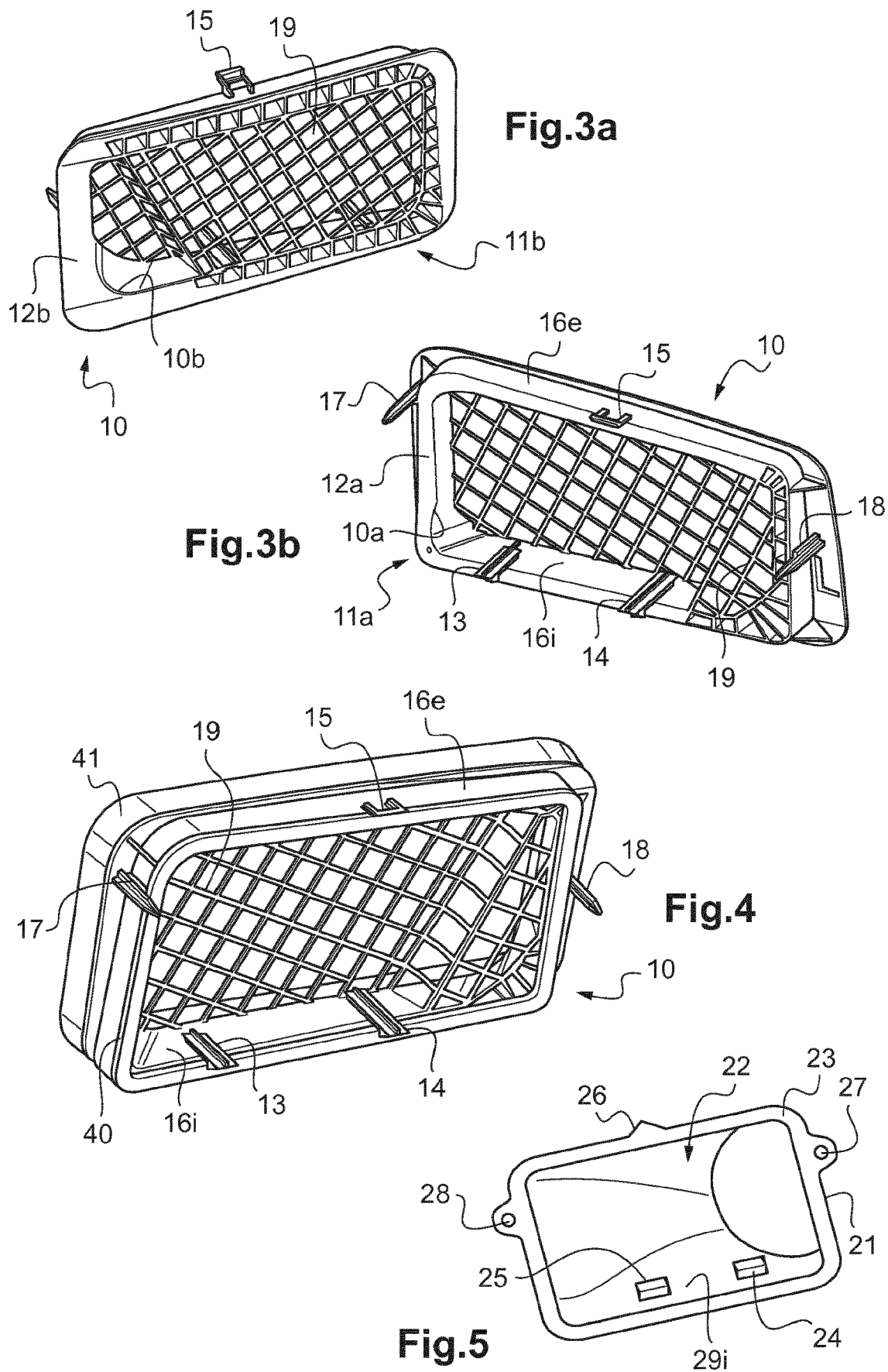

CONNECTING PIPE LINKING A THERMAL DEVICE OF A MOTOR VEHICLE TO A FIREWALL OF THE VEHICLE

BACKGROUND

The invention relates to a connecting pipe linking a thermal device of a motor vehicle to a firewall of the vehicle.

In a motor vehicle the air supplied to the passenger compartment is able to be heated or cooled by a thermal device according to requirements. This thermal device is located in the passenger compartment below the dashboard, against a sheet metal part generally called the firewall (apron) which separates the passenger compartment from the engine compartment of the front end of the vehicle. The thermal device comprises an air inlet connected to a water box located below the windshield of the vehicle, on the other side of the apron relative to the thermal device. An opening made through the firewall (apron) permits the circulation of air (in the direction of arrow A in FIG. 1) from the water box to the thermal device of the vehicle.

For different vehicle models it is advantageous to retain the same position of the thermal device relative to the apron, which permits the same parts to be used and thus the costs to be reduced. However, due to the different types of architecture of the vehicles, in particular between models with left-hand or right-hand drive, it is not always possible to retain the same position of the thermal device relative to the apron. In this case, it may be necessary to modify the apron, which may prove complex, or to provide a specific thermal device for each vehicle model, which increases the different types of parts and the manufacturing costs.

Thus there is a need for a solution permitting the same thermal device and the same apron to be retained for different vehicle models, whatever the relative positions of the thermal device and the apron.

BRIEF SUMMARY

To this end, the subject of the invention relates to a connecting pipe which is made from polymer material and which is designed to link an opening of an air inlet pipe of a thermal device of a motor vehicle and an opening of an apron of said vehicle. The connecting pipe is thus shaped to link an opening of the air inlet pipe of a thermal device of a motor vehicle and an opening of an apron, said connecting pipe, the cross section thereof being equal to or greater than the cross section of said air inlet pipe, having two open ends:
a first open end comprising a first interface which is shaped to be assembled and fixed to said air inlet pipe,
a second open end comprising a second interface which comprises a bearing surface which is shaped to be applied against the apron on the periphery of the apron opening.

The shape of the connecting pipe is thus determined as a function, on the one hand, of the distance separating the opening of the air inlet pipe and the opening of the apron and, on the other hand, of the relative position of these two openings. The production of this connecting pipe from polymer material permits a connecting pipe which is suitable for every vehicle to be easily produced, a thermal device and an apron having the same shape being able to be used for different vehicles.

The polymer material used may, for example, be polypropylene or any other suitable polymer and the connecting pipe may be produced in a simple manner by injection-molding.

The shape of the cross section of the connecting pipe is not limited and may be similar to the shape of the cross section of the air inlet pipe, for example of rectangular or parallelepipedal shape, so that the connecting pipe extends into the continuation of the air inlet pipe.

Advantageously and in a non-limiting manner, the first interface may comprise a bearing surface which is shaped to be applied against a corresponding bearing surface of said air inlet pipe. This may permit the production of a seal between the air inlet pipe and the connecting pipe to be facilitated. This seal may also be improved by the positioning of a gasket between the two bearing surfaces, for example a bonded gasket. In particular, the bearing surface of the first interface may have a shape which is complementary to the bearing surface of the air inlet pipe.

Advantageously and in a non-limiting manner, the first interface may comprise fixing means which are shaped to cooperate with corresponding, in particular complementary, fixing means which are fixed to said air inlet pipe. Said fixing means may be male and/or female fixing elements which are shaped to cooperate with corresponding female and/or male elements of the air inlet pipe, for example by clipping, insertion or interlocking. Fixing means of this type have the advantage of being able to be produced easily at low cost and avoiding the use of tools for the fixing. These male elements preferably extend parallel in the same direction, for example substantially perpendicular to the bearing surface of the first interface.

As a variant or additionally, the fixing means could be screws or rivets but this requires the use of a tool which is not advantageous.

The fixing means are not limited in number but are preferably at least two, for example three.

As an addition to the fixing means, the connecting pipe may also comprise positioning means which are shaped to cooperate with the air inlet pipe. Said positioning means may, for example, be at least two positioning fingers or orifices which are shaped to cooperate with corresponding, in particular complementary, positioning orifices or fingers of the air inlet pipe. The positioning means permit the positioning of the connecting pipe and the assembly thereof to be facilitated.

Such positioning means may be separate or not separate from the fixing means.

The fixing means, and possibly the fixing means, may advantageously be distributed over the periphery of the connecting pipe. All of the male-type elements of the connecting pipe (fixing means and positioning means) are advantageously parallel to one another.

Advantageously and in a non-limiting manner, the connecting pipe may be provided with a grille or a filter arranged through the cross section thereof, in order to prevent the introduction of particles inside the thermal device.

In order to improve the seal relative to air arranged between the connecting pipe and the thermal device and/or the apron, the first interface and/or the second interface may be provided with a gasket, for example a bonded gasket. Such a gasket may permit the seal relative to air and/or noise, in particular noise due to vibrations between the connecting pipe and the thermal device and/or the apron, to be improved.

A further subject of the invention relates to a thermal device of a motor vehicle which is designed to cooperate with a connecting pipe according to the invention, said thermal device comprising an air inlet pipe, one end thereof having an opening, characterized in that said air inlet pipe comprises on the periphery of the opening thereof a bearing surface which is shaped to be assembled and fixed to the first interface of said connecting pipe.

The same thermal device may thus be assembled to different connecting pipes, each connecting pipe being capable of use in a specific motor vehicle.

Advantageously, said air pipe may comprise a bearing surface which is shaped so as to be applied against a corresponding, in particular complementary, bearing surface of the first interface of said connecting pipe.

The bearing surfaces of the connecting pipe or the air inlet pipe preferably extend substantially perpendicular to a direction of circulation of air inside these pipes.

The air inlet pipe of the thermal device may comprise:
  fixing means which are shaped to cooperate with fixing means of the first interface of said connecting pipe of the air inlet pipe, these fixing means comprising, for example, male and/or female elements which are shaped to cooperate with corresponding, in particular complementary, male and/or female elements of the first interface, and possibly
  positioning means which are shaped to cooperate with the first interface of said connecting pipe, these positioning means comprising, for example, at least two positioning fingers or orifices which are shaped to cooperate with corresponding, in particular complementary, positioning orifices or fingers of the first interface.

Advantageously and in a non-limiting manner, said fixing means and possibly said positioning means extend in the extension of the bearing surface on the periphery of the opening or are located inside said air inlet pipe. In other words, the fixing means and possibly the positioning means of the air inlet pipe do not protrude outside the bearing surface of the first interface, perpendicular thereto. Such an arrangement may permit the same thermal device to be used in a vehicle, a connecting pipe not being necessary in said vehicle.

The air inlet pipe of the thermal device may also be provided with a grille or a filter arranged through its cross section. Thus it is possible to dispense with the presence of a grille or a filter inside the connecting pipe.

The invention further relates to a thermal device according to the invention provided with a connecting pipe according to the invention. In other words, a further subject of the invention relates to an assembly composed of a thermal device according to the invention and a connecting pipe according to the invention.

Finally, a further subject of the invention relates to a motor vehicle comprising an apron having a through-opening communicating with a water box, characterized in that it comprises a thermal device according to the invention and a connecting pipe according to the invention, wherein said connecting pipe is fixed to the air inlet pipe of the thermal device via the first interface thereof, the bearing surface of the second interface thereof being applied against the apron on the periphery of the opening of said apron.

Means for fixing the connecting pipe to the apron may also be conceived but are not absolutely necessary, to the extent that the connecting pipe may be held in abutment against the apron as a result of the mounting of the thermal device on the vehicle.

As already mentioned, a gasket may be arranged between the apron and the connecting pipe as a function of the desired level at seal relative to the air and/or noise between the apron and the connecting pipe. It is also possible to conceive of the use of a simple natural or artificial felt arranged between the apron and the connecting pipe, for example to absorb vibrations.

BRIEF DESCRIPTION OF THE DRAWINGS

The invention is now described with reference to the accompanying non-limiting drawings, in which:

FIGS. 3a and 3b are isometric views of the connecting pipe shown in FIG. 2, FIG. 3a showing the second interface of the connecting pipe and FIG. 3b showing the first interface of the connecting pipe, FIG. 4 shows a perspective view of the connecting pipe shown in FIGS. 3a and 3b provided with gaskets on the two interfaces thereof, FIG. 5 shows a plan view of the opening of the air inlet pipe of the thermal device shown in FIG. 2.

DETAILED DESCRIPTION

"Substantially parallel or perpendicular" is understood as a direction/a plane forming an angle of at most ±10° or even at most ±5°, or at most ±1°, with a direction/a plane which is parallel or perpendicular.

Figure 1:
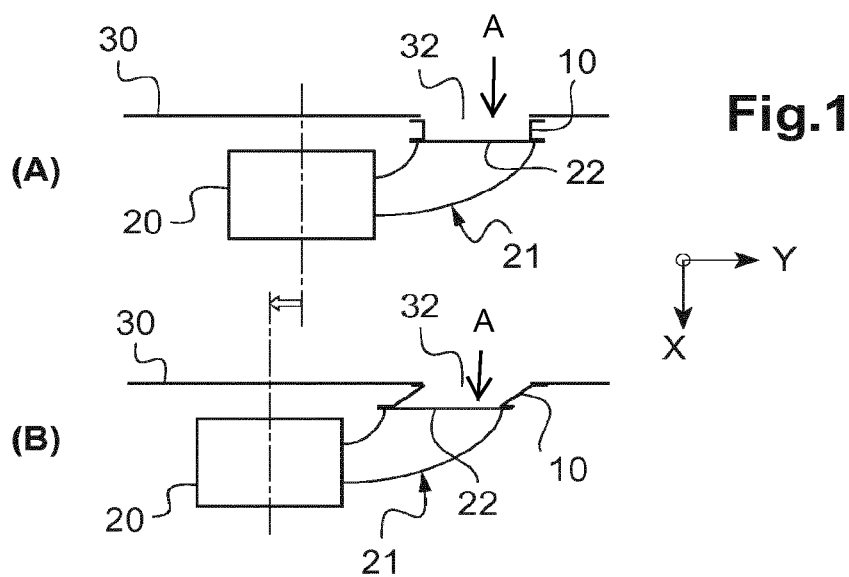
FIG. 1 shows schematically a thermal device which may be positioned in two positions (A) and (B) relative to an apron of a motor vehicle by means of a connecting pipe according to the invention.

FIG. 1 shows schematically a thermal device 20 of a motor vehicle comprising, in particular, an air inlet pipe 21, one free end thereof having an opening 22 and an apron 30 of a motor vehicle having, in particular, a through-opening 32 communicating with a water box (not shown).

The thermal device 20 may be arranged differently relative to the apron 30 as a function of the type of vehicle. By way of example, the position (A) of FIG. 1 corresponds to a left-hand drive vehicle, whilst the position (B) of FIG. 1 corresponds to a right-hand drive vehicle it is noteworthy that the thermal device 20 is offset transversely (along the transverse axis Y of the vehicle) between the two positions as indicated by the arrow shown in FIG. 1.

According to the invention, a connecting pipe 10 made from polymer material is shaped to link the opening 22 of the air inlet pipe of the thermal device 20 and the opening 32 of the apron 30. As the thermal device 20 is able to occupy different positions from one vehicle to the next, as symbolized by the positions (A) and (B), a different shape of connecting pipe 10 is produced for each of the positions (A) and (B), as visible in FIG. 1.

In order to avoid any loss of pressure, this connecting pipe 10 has a cross section which is equal to or greater than the cross section of the air inlet pipe 21.

The connecting pipe 10 is disclosed in more detail in FIGS. 3a, 3b and 4. It has two open ends 10a, 10b:
  a first open end 10a (visible in FIG. 3b) comprising a first interface 11a which is shaped to be assembled and fixed to the air inlet pipe 21,
  a second open end 10b (visible in FIG. 3a) comprising a second interface 11b which comprises a bearing surface 12b which is shaped to be applied against the apron 30 on the periphery of the apron opening 32.

In the example shown, the shape of the cross section of the connecting pipe 10 is similar to the shape of the cross section of the air inlet pipe 21, namely substantially rectangular shape, so that the connecting pipe 10 extends in the continuation of the air inlet pipe 21 and thus forms an extension thereof.

The first interface 11a comprises a bearing surface 12a which is shaped to be applied against a corresponding bearing surface 23 of the air inlet pipe 21, disclosed below.

The bearing surfaces 12a and 12b may be planar or substantially planar as in the example shown.

The first interface 11a also comprises fixing means which are shaped to cooperate with the corresponding fixing means fixed to the air inlet pipe 21. In the example, these fixing means comprise:

two male fixing elements 13, 14 which are shaped to cooperate with corresponding female elements 24, 25 of the air inlet pipe 21, a female fixing element 15 which is shaped to cooperate with a corresponding male element 26 of the air inlet pipe 21.

The male fixing elements 13, 14 are tabs extending substantially perpendicular to the bearing surface 12a, from an internal lateral surface 16i of the connecting pipe 10. These male fixing elements 13, 14 have a widened free end in order to permit clipping into corresponding female elements 24, 25 of the air inlet pipe 21.

The female fixing element 15 is in the form of a tab provided with a slot, the corresponding male element 26 of the air inlet pipe 21 being able to be inserted, possibly clipped, therein. This female element 15 extends substantially perpendicular to the bearing surface 12a from an external lateral surface 16e of the connecting pipe 10.

In the example shown, the male elements 13, 14 and the female element 15 are respectively arranged on opposing sides of the connecting pipe 10.

The connecting pipe 10 shown also comprises positioning means which are shaped to cooperate with the air inlet pipe 21. In the example, the positioning means are two positioning fingers 17, 18 which are shaped to cooperate with corresponding positioning orifices 27, 28 of the air inlet pipe 21. The positioning fingers 17, 18 protrude from the connecting pipe 10 substantially perpendicular to the bearing surface 12a outside the connecting pipe 10 and are arranged on opposing sides thereof without fixing means, as visible in FIG. 3b. The fixing means 13-15 and positioning means 17, 18 are thus distributed over the entire periphery of the connecting pipe 10.

The connecting pipe 10 shown is also provided with a grille 19 through the cross section thereof, said grille thus forming a filter. As a variant, such a filter may be arranged in the air inlet pipe of the thermal device (not shown).

The connecting pipe 10 finally comprises two gaskets 40, 41 respectively applied to the bearing surfaces 12a and 12b as visible in FIG. 4. It will be observed that the gasket 41 has a relatively large thickness, permitting it to be compressed between the connecting pipe 10 and the apron 30 when the thermal device 20 provided with the connecting pipe 10 is mounted on the vehicle.

Figure 2:
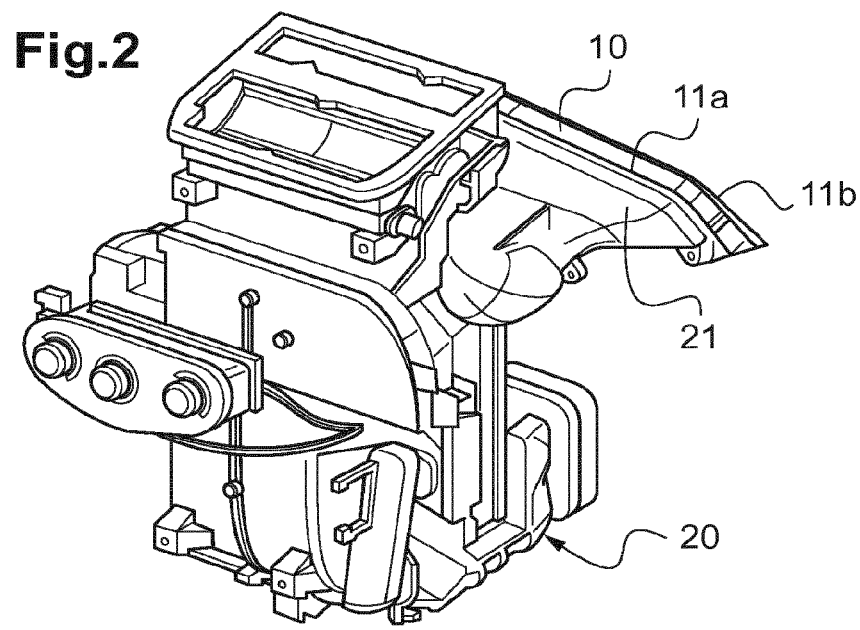
FIG. 2 shows in perspective a thermal device and a connecting pipe according to one embodiment of the invention.

The thermal device 20, the subject of the invention shown in FIG. 2, thus comprises an air inlet pipe 21 which is shaped to receive the connecting pipe 10 by fixing on the side of the opening 22 thereof. This opening 22 is shown in more detail in FIG. 5. As visible in this figure, the air inlet pipe 21 comprises, on the periphery of the opening 22 thereof, a bearing surface 23 which is shaped to be assembled and fixed to the first interface 11a of the connecting pipe 10 as shown in FIG. 2.

The bearing surfaces 12a, 23 of the connecting pipe or the air inlet pipe preferably extend substantially perpendicular to a direction of circulation of the air inside these pipes along the axis of the pipes and are of complementary shape.

In order to permit the fixing of the connecting pipe 10, the air inlet pipe 21 of the thermal device comprises fixing means which are shaped to cooperate with the fixing means 13, 14, 15 of the first interface 11a of the connecting pipe 10.

These fixing means comprise:

two female elements 24, 25 formed on an internal wall 29i of the air inlet pipe 21 and forming housings which are shaped to receive the male elements 13, 14, a male element 26 arranged in the extension of the bearing surface 23 protruding from one edge thereof.

More specifically, the female elements define housings having a shape complementary to the male elements and are shaped so that the widened part of the male elements bears against an edge of the housing.

The air inlet pipe 21 also comprises positioning means which are shaped to cooperate with the first interface 11a of the connecting pipe 10, namely two orifices 27, 28 also arranged in the extension of the bearing surface 23 and having a shape which is complementary to the positioning fingers 17, 18 of the connecting pipe 10.

It is noteworthy that the fixing mean 26 and the positioning means 27, 28 of the air inlet pipe 21 are arranged on the edges of the bearing surface 23 in the extension thereof and the fixing means 24 and 25 are arranged inside the air inlet pipe 21, such that no element of the air inlet pipe protrudes from the bearing surface, perpendicular thereto, outside the air inlet pipe, which permits this bearing surface also to be applied directly onto a vehicle apron.

The positioning of the connecting pipe 10 is this very simple; it suffices to bring the first interface 11a of the connecting pipe toward the bearing surface 23 of the air inlet pipe 21 of the thermal device, such that the positioning fingers 17, 18 penetrate the inside of the respective corresponding positioning orifices 27, 28 of the air inlet pipe 21 and to continue to bring the two parts toward one another so that the male fixing elements 13, 14 penetrate inside the respective female elements 24, 25 and that the male element 26 may be inserted inside the female element 15 of the connecting pipe 10, this bringing-together being continued until a contact is obtained between the bearing surfaces 12a and 23 and the fixing means are engaged. The two parts are thus fixed and the thermal device 20 may be mounted inside the vehicle with the appropriate connecting pipe 10, the bearing surface 12b of the connecting pipe 10 bearing against the apron 30.

The invention thus permits a large number of connecting pipes of different shapes to be produced, with a specific shape for each vehicle model. Thus, it is possible for only the connecting pipe to be produced specifically for a vehicle model, the same thermal device and the same apron being used for different vehicle models.

The invention claimed is:

1. A connecting pipe which is made from polymer material having two open ends and which is shaped to link an opening of an air inlet pipe of a thermal device of a motor vehicle and an opening of a firewall of said vehicle, said connecting pipe, a cross section thereof being equal to or greater than a cross section of said air inlet pipe, said connecting pipe including:

a first open end comprising a first interface which is shaped to be assembled and fixed to said air inlet pipe, the first interface comprising:

a planar bearing surface which is shaped to be applied against a corresponding planar bearing surface of said air inlet pipe, a male fixing element extending along an internal lateral surface of the connecting pipe, substantially perpendicular to the connecting pipe planar bearing surface, and a female fixing element extending along an external lateral surface of the connecting pipe, substantially perpendicular to the connecting pipe planar bearing surface; and a second open end comprising a second interface which comprises a bearing surface which is shaped to be applied against the firewall on the periphery of the firewall opening.

2. The connecting pipe as claimed in claim 1, wherein the male and female fixing elements are shaped to cooperate with corresponding female and male elements of the air inlet pipe.

3. The connecting pipe as claimed in claim 1, further comprising a grille or a filter arranged through the cross section of the connecting pipe.

4. The connecting pipe as claimed in claim 1, wherein at least one of the first interface and the second interface is provided with a gasket.

5. A thermal device of a motor vehicle which is configured to cooperate with the connecting pipe as claimed in claim 1, said thermal device comprising:

an air inlet pipe, one end thereof having an opening, wherein said air inlet pipe comprises on the periphery of the opening thereof a planar bearing surface which is shaped to be assembled and fixed to the first interface of said connecting pipe, the planar bearing surface extending in a direction perpendicular to a direction of circulation of air inside the air inlet pipe, and wherein the air inlet pipe comprises:

a female elements formed on an internal wall of the air inlet pipe, a male element that is co-planar with the bearing surface and protrudes from an outer edge of the bearing surface, and positioning orifices that are co-planar with the bearing surface and protrude from the outer edge of the bearing surface.

6. The thermal device as claimed in claim 5, wherein the male and female elements are shaped to cooperate with the female and male elements, respectively, of the first interface.

7. The thermal device as claimed in claim 5, further comprising the connecting pipe.

8. A motor vehicle comprising:

a firewall having a through-opening communicating with a cowl;

the thermal device as claimed in claim 5; and the connecting pipe, wherein said connecting pipe is fixed to the air inlet pipe to the thermal device via the first interface thereof, the bearing surface of the second interface thereof being applied against the firewall on the periphery of the opening of said firewall.

9. The connecting pipe as claimed in claim 1, wherein the first interface further comprises positioning fingers extending substantially perpendicular to the planar bearing surface from the external lateral surface of the connecting pipe.

10. The connecting pipe as claimed in claim 9, wherein the positioning fingers are shaped to cooperate with corresponding positioning orifices of the air inlet pipe.

11. The connecting pipe as claimed in claim 1, wherein the female fixing element is a tab including a slot at a center of the tab to receive a male element from the air inlet pipe.

12. The connecting pipe as claimed in claim 1, wherein each of the male fixing elements is a tab having a first end connected to the internal lateral surface of the connecting pipe and a free second end, the free second end being wider than the first end.

* * * * *